(12) United States Patent
Petladwala et al.

(10) Patent No.: US 11,200,134 B2
(45) Date of Patent: Dec. 14, 2021

(54) ANOMALY DETECTION APPARATUS, METHOD, AND PROGRAM RECORDING MEDIUM

(71) Applicant: NEC CORPORATION, Tokyo (JP)

(72) Inventors: Murtuza Petladwala, Tokyo (JP); Ryota Suzuki, Tokyo (JP); Shigeru Koumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/981,101

(22) PCT Filed: Mar. 26, 2018

(86) PCT No.: PCT/JP2018/012079
§ 371 (c)(1),
(2) Date: Sep. 15, 2020

(87) PCT Pub. No.: WO2019/186634
PCT Pub. Date: Oct. 3, 2019

(65) Prior Publication Data
US 2021/0109833 A1    Apr. 15, 2021

(51) Int. Cl.
*G06F 1/28* (2006.01)
*G06F 11/30* (2006.01)
(52) U.S. Cl.
CPC .......... *G06F 11/3062* (2013.01); *G06F 1/28* (2013.01)
(58) Field of Classification Search
CPC .................... G06F 11/3062; G06F 1/28
See application file for complete search history.

(56) References Cited

U.S. PATENT DOCUMENTS

| 7,308,385 B2 | 12/2007 | Wegerich et al. |
| 9,075,713 B2 | 7/2015 | Jones et al. |

(Continued)

FOREIGN PATENT DOCUMENTS

| JP | 11-212947 A | 8/1999 |
| WO | 02/086726 A1 | 10/2002 |

(Continued)

OTHER PUBLICATIONS

International Search Report for PCT/JP2018/012079 dated Jun. 12, 2018 [PCT/ISA/210].

(Continued)

*Primary Examiner* — Zahid Choudhury
(74) *Attorney, Agent, or Firm* — Sughrue Mion, PLLC

(57) ABSTRACT

An anomaly detection apparatus estimates time series data of a first signal of each appliance by disaggregating an aggregate signal that is a sum of first signals of a plurality of appliances into each first signal of an individual appliance, calculates a residual by subtracting sum of the estimated first signals of the plurality of appliances from the aggregate signal, and obtains value of the second signal at a time point at which the residual indicates presence of anomaly, and checks if there is match of pair of value of the estimated first signal and estimated state of the appliance, with any one of the one or more pairs of value of the first signal and state of the appliance, stored in a table, in association with the value of the second signal at the time point at which the residual indicates presence of anomaly to identify appliance with anomaly.

15 Claims, 11 Drawing Sheets

(56) References Cited

U.S. PATENT DOCUMENTS

| | | | |
|---|---|---|---|
| 9,476,935 B2 * | 10/2016 | Kabler | G01D 4/008 |
| 9,612,286 B2 * | 4/2017 | Gupta | G01R 31/34 |
| 10,083,255 B2 | 9/2018 | Majewski et al. | |
| 10,187,707 B2 | 1/2019 | Norwood et al. | |
| 2002/0183971 A1 | 12/2002 | Wegerich et al. | |
| 2003/0139908 A1 | 7/2003 | Wegerich et al. | |
| 2006/0036403 A1 | 2/2006 | Wegerich et al. | |
| 2010/0280978 A1 * | 11/2010 | Shimada | H02J 13/00002 |
| | | | 706/12 |
| 2010/0305889 A1 * | 12/2010 | Tomlinson, Jr. | G06N 7/005 |
| | | | 702/62 |
| 2012/0197560 A1 | 8/2012 | Kuhns et al. | |
| 2013/0204552 A1 * | 8/2013 | Lin | F24F 11/30 |
| | | | 702/58 |
| 2013/0318011 A1 | 11/2013 | Jones et al. | |
| 2014/0172400 A1 | 6/2014 | Majewski et al. | |
| 2015/0377935 A1 | 12/2015 | Kuhns et al. | |
| 2016/0212506 A1 | 7/2016 | Norwood et al. | |
| 2017/0315855 A1 * | 11/2017 | Doblander | G06F 11/0736 |
| 2019/0102492 A1 | 4/2019 | Majewski et al. | |
| 2019/0121337 A1 | 4/2019 | Cohen et al. | |
| 2019/0261067 A1 | 8/2019 | Norwood et al. | |

FOREIGN PATENT DOCUMENTS

| | | |
|---|---|---|
| WO | 2016/081510 A1 | 5/2016 |
| WO | 2017/179049 A1 | 10/2017 |

OTHER PUBLICATIONS

Written Opinion for PCT/JP2018/012079 dated Jun. 12, 2018 [PCT/ISA/237].

* cited by examiner

[Fig. 1]
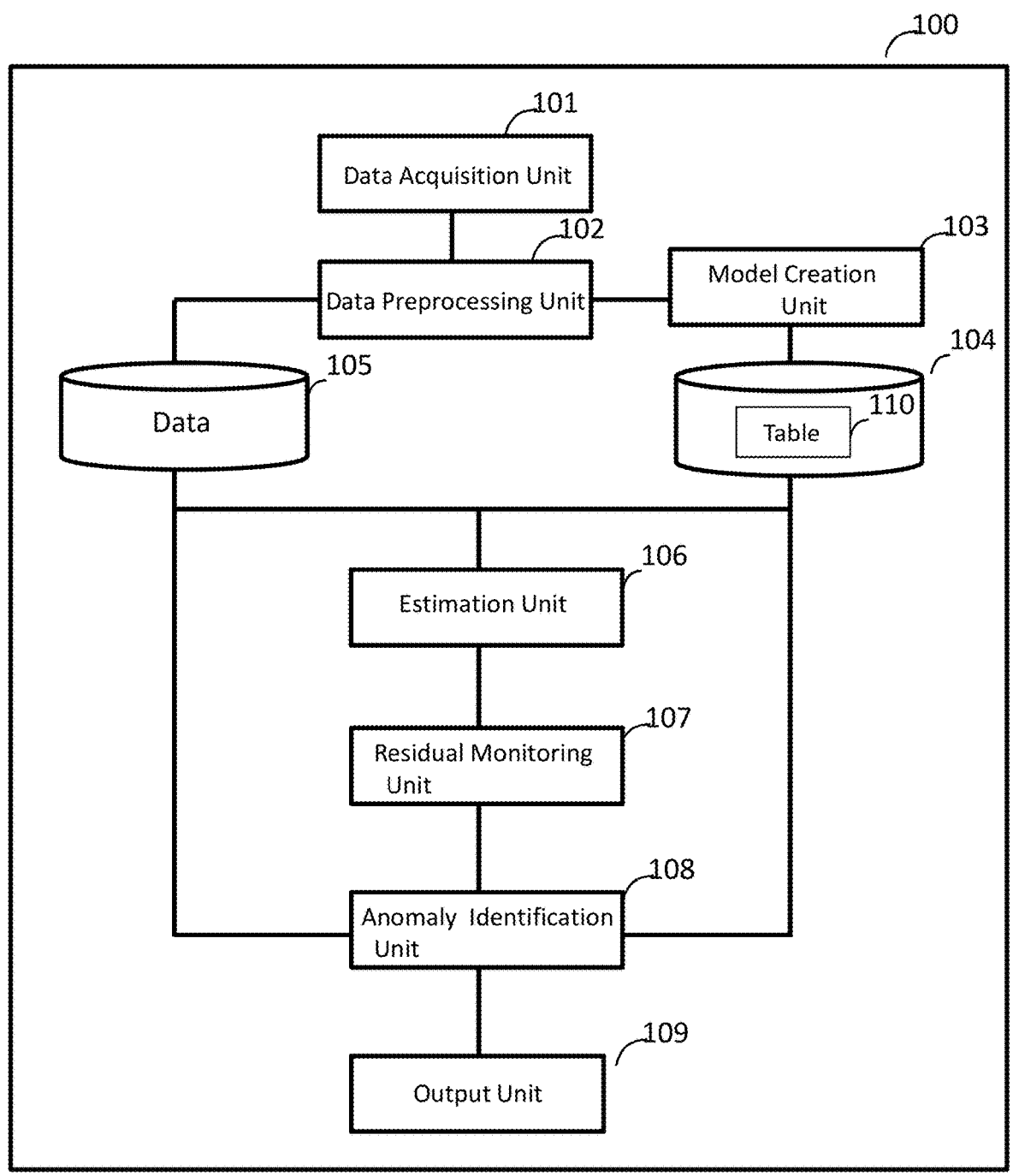

[Fig. 2]
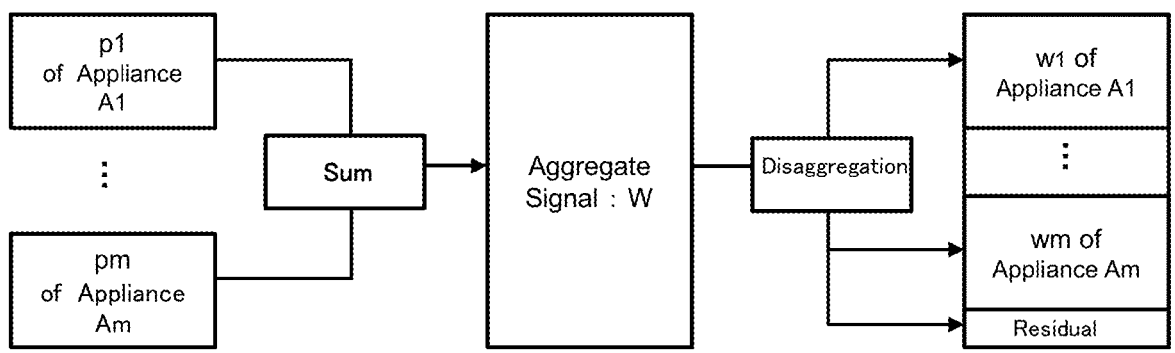

[Fig. 3A]
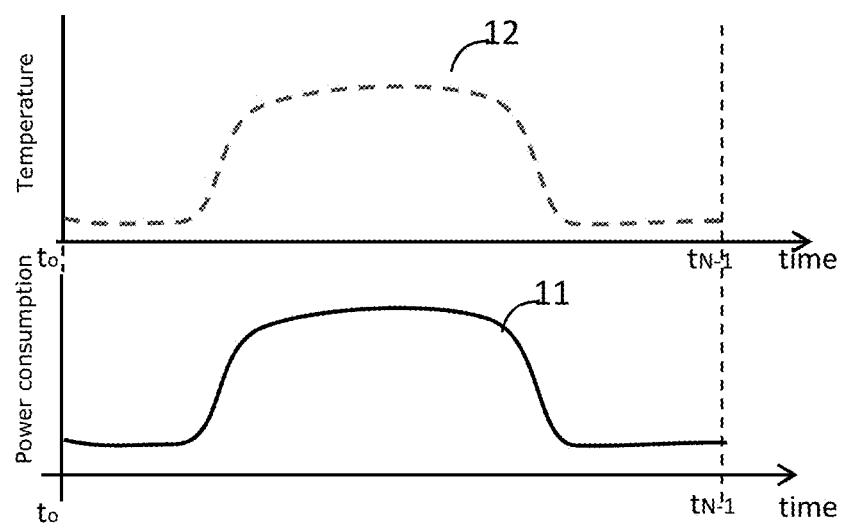

[Fig. 3B]
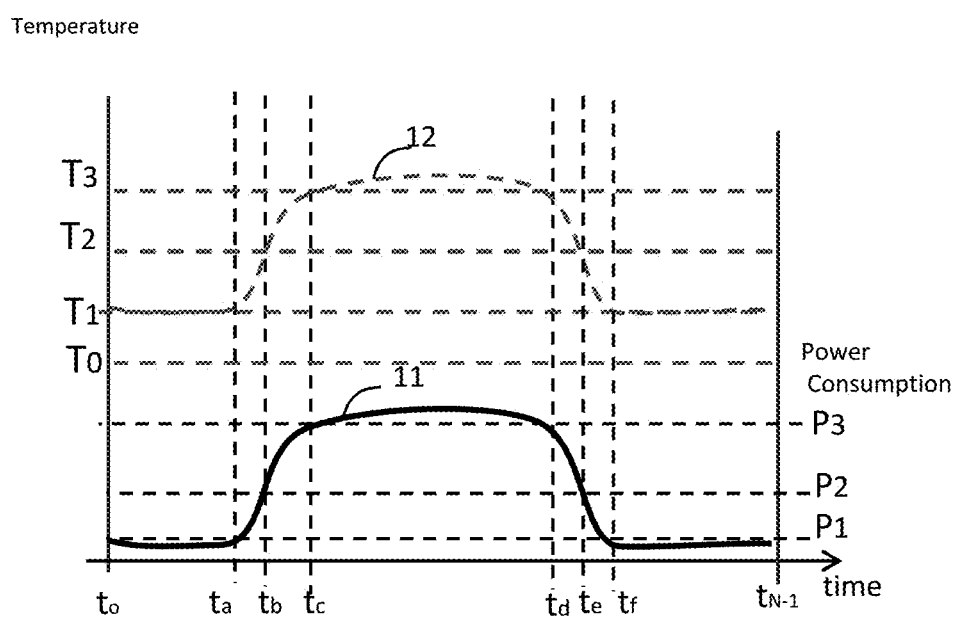

[Fig. 4]
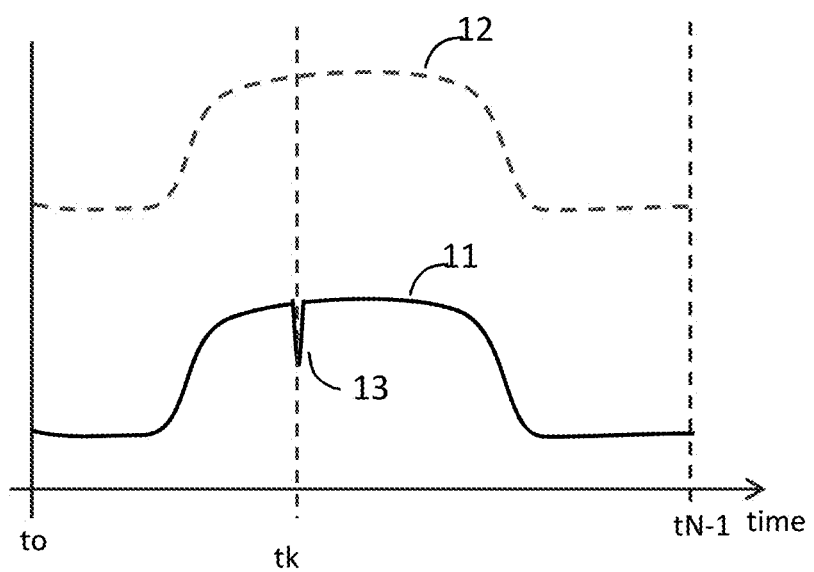

[Fig. 5]
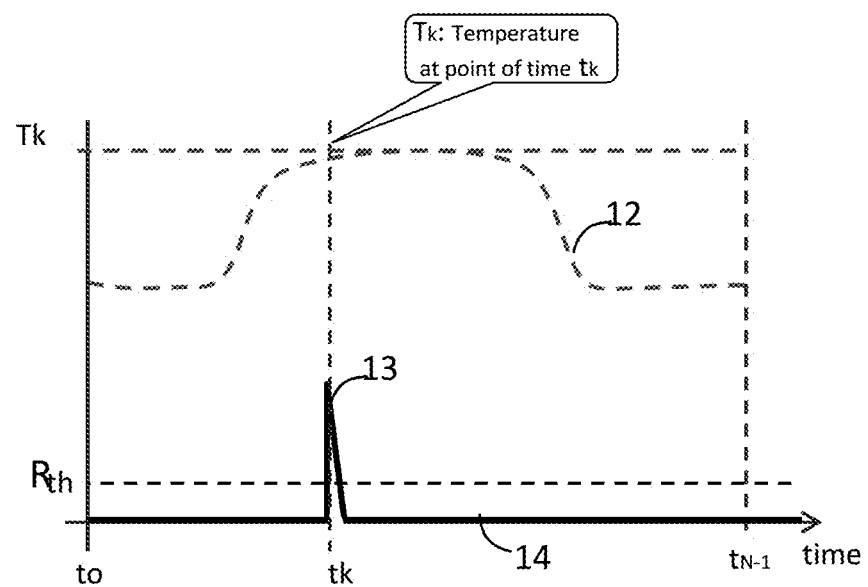

[Fig. 6]

[Fig. 7]
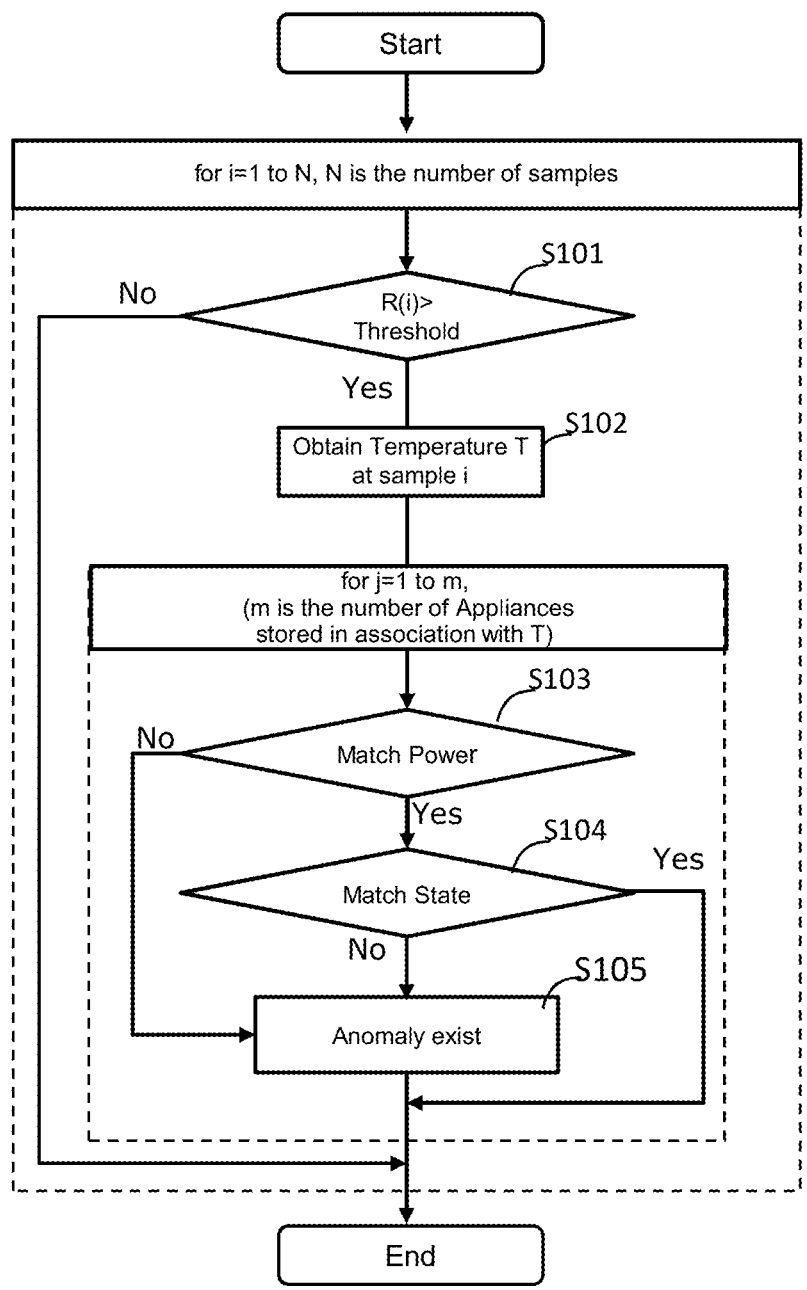

[Fig. 8A]
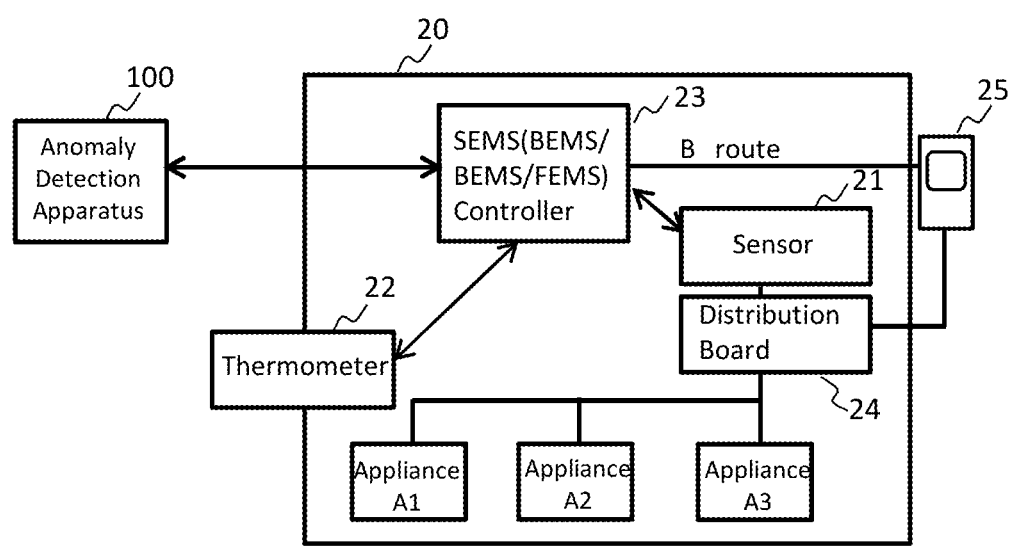

[Fig. 8B]
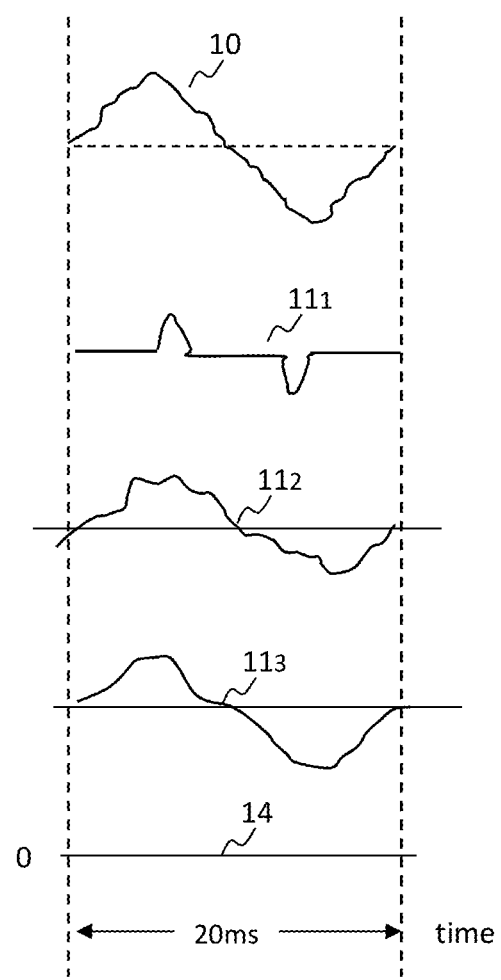

[Fig. 9]
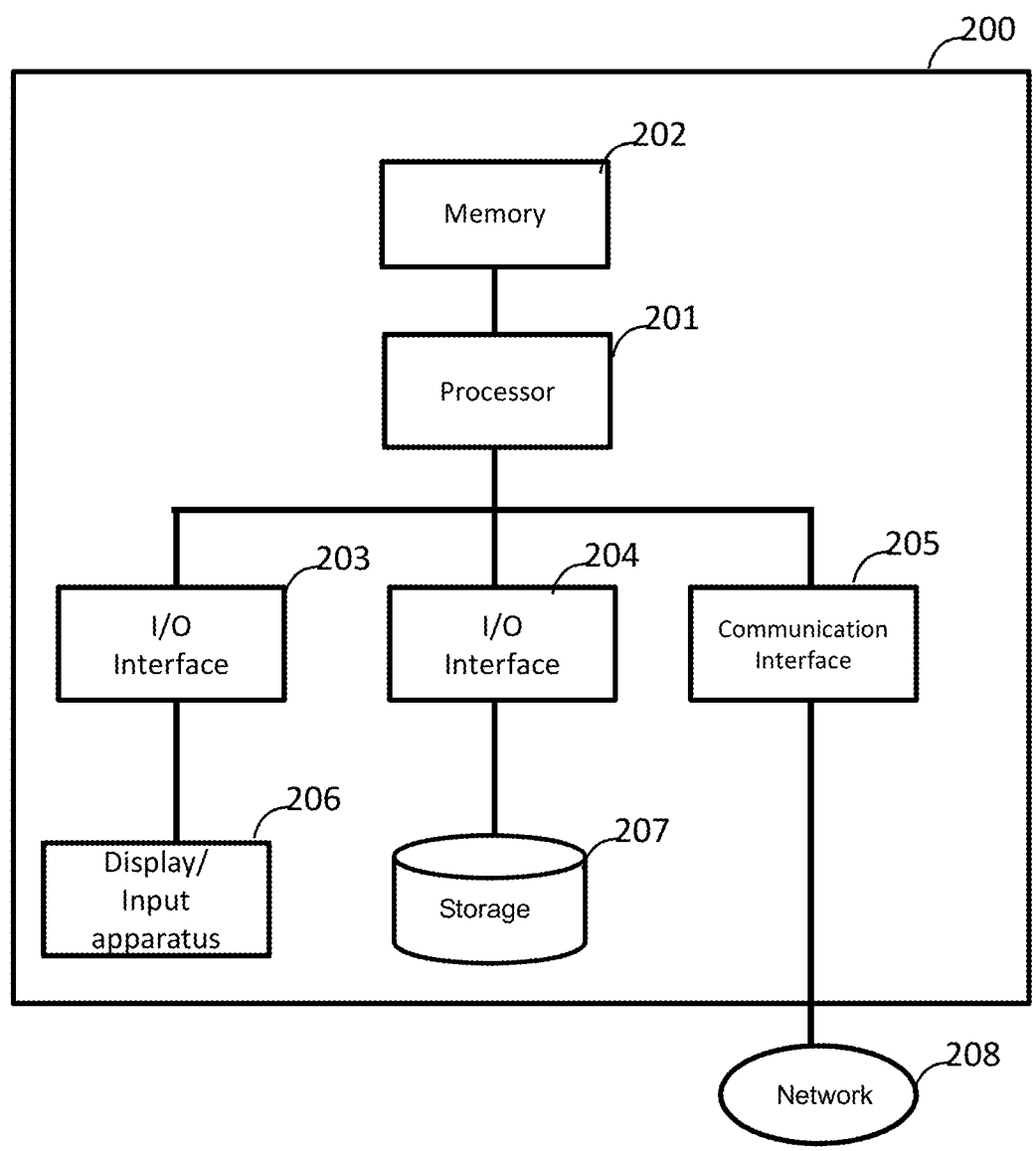

ANOMALY DETECTION APPARATUS, METHOD, AND PROGRAM RECORDING MEDIUM

CROSS REFERENCE TO RELATED APPLICATIONS

This application is a National Stage of International Application No. PCT/JP2018/012079 filed Mar. 26, 2018.

FIELD

The present invention relates to an anomaly detection apparatus, method, disaggregation system and program recording medium.

BACKGROUND

Disaggregation technology is used to estimate a state(s) (e.g., operation state) of an individual appliance from an aggregate (synthetic) signal such as power consumption, of a plurality of electric appliances (hereinafter termed as "appliance") that is acquired by non-intrusive load monitoring (NILM) by disaggregating an aggregate signal into a waveform of each individual appliance. A disaggregation system performs disaggregation of the aggregate signal into an individual signal of each appliance, for example, based on pattern matching with respective learned models of waveform data of appliances. As an algorithm for disaggregation, such algorithms as Factorial Hidden Markov Model (FHMM), Combinatorial Optimization, Blind Source Separation and so forth may be utilized.

Anomaly detection for time series data is usually performed by finding, for example, outlier data points relative to some standard or usual signal.

One of related approaches to detect anomaly in power consumption uses a threshold or a predetermined range of an upper bound and/or lower bound of the power consumption to find outlier data points relative to some standard or usual (normal) signal.

Anomaly in general is of various types depending on particular appliances. The above mentioned related approach may fail to detect anomaly in a disaggregated signal. The reason is that disaggregation or estimation of a signal of an individual apparatus is performed based on a learned model that is created in advance, based on known states of each appliance working in normal operation. The above mentioned related approach cannot well determine in which disaggregated signal anomaly is present.

In Patent Literature 1, there is disclosed a system for empirically diagnosing a condition of a monitored system, wherein estimates of monitored parameters from a model of the system provide residual values that can be analyzed for failure mode signature recognition. Residual values can also be tested for alert (non-zero) conditions, and patterns of alerts thus generated are analyzed for failure mode signature patterns. The system employs a similarity operator for signature recognition and also for parameter estimation. Failure modes are empirically determined, and precursor data is automatically analyzed to determine differentiable signatures for failure modes.

In Patent Literature 2, there is disclosed a system that performs disaggregation of electrical devices by capturing electrical signatures of specific devices in the residence. Disaggregation may include non-intrusive load monitoring. Device history database may include historical data about signals, characteristic, power consumption performance data of specific devices in a residence. The system may track and analyze trends in use of trend of a specific device. The trend data may be used to assess the likelihood of failure of a given device. A model device characteristics database may include model signatures.

In Patent Literature 3, there is disclosed a system or device that is configured to disaggregate power for isolated appliances, wherein anomalies in the time series, such as an appliance turning on and then turning on again before being turned off, can be detected. Power signature of a transition from one state to the next is defined and the signature is compared to a library of signatures already isolated. One or more, such as a weighted combination, of goodness of fit indicators (i.e. correlation coefficient, slope, intercept, root mean square error, residual) are used.

CITATION LIST

Patent Literature

[Patent Literature 1] WO2002/086726A1
[Patent Literature 2] WO2016-081510A1
[Patent Literature 3] US2012/0197560A1

SUMMARY

As described above, an anomaly in an appliance is generally unknown to a learned model because the learned model is created in advance, based on known states of each appliance working in normal operation. As a result, an anomaly detection algorithm is unable to find anomaly or a state unknown to the learned model, from a signal of an individual appliance obtained by disaggregation, thereby leading to deterioration in estimation accuracy of a state of the appliance.

The present invention is invented to solve the above problem and one of the objects of the invention is to provide an apparatus, method and recording medium, each enabling incorporation of anomaly detection in disaggregation with reduced complexity.

According to an aspect of the present invention, there is provided an anomaly detection apparatus comprising:

a data acquisition unit that acquires time series data of an aggregate signal that is a sum of first signals of a plurality of appliances and time series data of a second signal;

a table including one or more pairs of a value of the first signal and a corresponding state of each appliance, in association with a value of the second signal;

an estimation unit that receives time series data of the aggregate signal to estimate time series data of the first signal of each appliance by disaggregating the aggregate signal into each first signal of an individual appliance;

a residual calculation unit that calculates a residual by subtracting a sum of the estimated first signals of the plurality of appliances from the aggregate signal; and an anomaly identification unit that obtains a value of the second signal at a time point at which the residual indicates presence of anomaly, and checks if there is a match of a pair of a value of the estimated first signal and an estimated state of the appliance, with any one of the one or more pairs of a value of the first signal and a state of the appliance, stored in the table, in association with the value of the second signal at the time point at which the residual indicates presence of anomaly to identify the appliance with anomaly.

According to an aspect of the present invention, there is provided a computer-based method of detecting anomaly, comprising:

acquiring time series data of an aggregate signal that is a sum of first signals of a plurality of appliances and time series data of a second signal;

creating a table including one or more pairs of a value of the first signal and a corresponding state of each appliance, in association with a value of the second signal;

receiving time series data of the aggregate signal to estimate time series data of the first signal of each appliance by disaggregating the aggregate signal into each first signal of an individual appliance;

calculating a residual by subtracting a sum of the estimated first signals of the plurality of appliances from the aggregate signal;

obtaining a value of the second signal at a time point at which the residual indicates presence of anomaly, and checking if there is a match of a pair of a value of the estimated first signal and an estimated state of the appliance, with any one of the one or more pairs of a value of the first signal and a state of the appliance, stored in the table, in association with the value of the second signal at the time point at which the residual indicates presence of anomaly to identify the appliance with anomaly.

According to an aspect of the present invention, there is provided a recording medium storing therein a program or a program causing a computer to execute anomaly detection processing comprising:

acquiring time series data of an aggregate signal that is a sum of first signals of a plurality of appliances and time series data of a second signal;

creating a table including one or more pairs of a value of the first signal and a corresponding state of each appliance, in association with a value of the second signal;

receiving time series data of the aggregate signal to estimate time series data of the first signal of each appliance by disaggregating the aggregate signal into each first signal of an individual appliance;

calculating a residual by subtracting a sum of the estimated first signals of the plurality of appliances from the aggregate signal;

obtaining a value of the second signal at a time point at which the residual indicates presence of anomaly, and checking if there is a match of a pair of a value of the estimated first signal and an estimated state of the appliance, with any one of the one or more pairs of a value of the first signal and a state of the appliance, stored in the table, in association with the value of the second signal at the time point at which the residual indicates presence of anomaly to identify the appliance with anomaly.

The recording medium may be a non-transitory computer-readable recording medium such as a semiconductor memory (Random Access Memory (RAM), Read Only Memory (ROM), Electrically Erasable and Programmable Read Only Memory (EEPROM), flash memory, or the like), Hard Disk Drive (HDD), Solid State Drive (SSD), Compact Disc, Digital Versatile Disc, and so forth).

According to the present invention, it is possible to incorporate anomaly detection in disaggregation with reduced complexity.

BRIEF DESCRIPTION OF DRAWINGS

FIG. 1 is a diagram illustrating an arrangement of an example embodiment.

FIG. 2 schematically illustrates a residual in disaggregation.

FIG. 3A schematically illustrates times series data of temperature and power consumption of an appliance.

FIG. 3B schematically illustrates creation of a table in which state and power consumption of an appliance is stored in association with temperature from the time series data of temperature and power consumption.

FIG. 4 schematically illustrates times series data of temperature and power consumption of an appliance with anomaly.

FIG. 5 schematically illustrates times series data of temperature and residual after disaggregation.

FIG. 6 schematically illustrates an example of a table created by model creation unit.

FIG. 7 schematically illustrates an example of operation of the example embodiment.

FIG. 8A schematically illustrates a use case.

FIG. 8B schematically illustrates an example of disaggregation in FIG. 8A.

FIG. 9 schematically illustrates an example of implemented embodiment.

DETAILED DESCRIPTION

The following describes example embodiments of the present invention. FIG. 1 is a diagram illustrating an arrangement of an example embodiment. An anomaly detection apparatus (or system) 100 performs disaggregation processing of an aggregate signal of a first signal (e.g., power consumption) of a plurality of appliances into an individual signal of each appliance. The anomaly detection apparatus 100 is configured to identify anomaly in disaggregated individual signal, based on a residual and a monitored second signal (e.g., temperature).

Referring to FIG. 1. the anomaly detection apparatus 100 includes a data acquisition unit 101, a data preprocessing unit 102, a model creation unit 103, a storage 104 for storing a model (table), a storage 105 for storing data (time series data), an estimation unit 106, a residual monitoring unit 107, an anomaly identification unit 108, and an output unit 109. The units 101-109 may be integrated in a unit or may be arranged separately wherein units 101-107 are connected by a network.

In disaggregation processing, anomaly (data corresponding to an unknown state of an appliance) falls into residual information. In the example embodiment, residual information in disaggregation is used for detecting anomaly.

Residual is a remaining part of an aggregate signal after an individual signal of each appliance is estimated in disaggregation. For example, as illustrated in FIG. 2. in the case of disaggregation of an aggregate signal W that is a sum of signals p1-$pm$ of m-appliances A1-Am into individual signals w1-$wm$ of the m-appliances A1-Am, a residual is left out other than individual signals w1-$wm$ of appliances. The aggregate signal may contain new states or unknown states that are not present in a learned model. The new states or unknown state may fall in a residual after disaggregation of the aggregate signal W into signals w1-$wm$ of individual appliances A1-Am.

The data acquisition unit 101 acquires time series (waveform) data of an aggregate signal of power consumption, for example, at a main line or a power distribution board (not illustrated in the drawing) to which one or more appliances are connected. The data acquisition unit 101 may acquire time series data of aggregate signal of power consumption via a B root from a smart meter that measures power consumption of a plurality of appliances at predetermined interval.

The data acquisition unit 101 acquires times series data of a second signal (e.g., temperature). Temperature may be measured by a thermometer installed outside, or at a location where the one or more appliances are disposed, or at a neighboring location.

The data acquisition unit 101 may acquire the time series data of power consumption and temperature, via one or more communication networks, such as LAN (local area network) and/or WAN (wide area network), from an electric power sensor and a temperature sensor (thermometer) (not illustrated in the drawing). Each sensor may be made by IoT (Internet of Things) devices that samples (measures) a signal and is equipped with a communication function to connect to the Internet.

The data preprocessing unit 102 may calculate (extract) features from the time series (waveform) data acquired by the data acquisition unit 101 and save the calculated features in the data storage unit 105. For example, the data preprocessing unit 102 may integrate a power consumption data, for a predetermined time interval, to obtain an integrated power.

The data preprocessing unit 102 may interpolate the time series data of the second signal (temperature) sampled at a predetermined time interval to synchronize with the time series data of the power consumption.

Though not limited thereto, time series data of the aggregate signal W of power consumption and time series data of temperature T may have a common time axis, that is, an i-th element of temperature: $T(i)$ $(i=1, \ldots, N)$ corresponds to an i-th element of the aggregate signal: $W(i)$ $(i=1, \ldots, N)$.

The data preprocessing unit 102 may use as a feature value a peak value, an average value, a wave height value, etc. of the waveform (time series data) in a time domain. The data preprocessing unit 102 may, if necessary, decimate or interpolate (re-sample) in time domain, element data of the time series acquired by the data acquisition unit 101. Alternatively, the data preprocessing unit 102 may transform the time series data using Fourier transform (Fast Fourier Transform (FFT) or Discrete Fourier Transform (DFT), etc.) into a frequency domain to calculate a feature value based on frequency spectrum components.

Initially, model training and state learning may be executed to acquire appliance parameters (power consumption and state of each appliance). The model creation unit 103 creates at least a table in which an entry including power consumption value and a state associated with the power consumption of each appliance, at a preset temperature value is provided, and stores the table in the storage 104. The model creation unit 103 may, as a matter of course, create a state transition model of each appliance, or calculate model parameters used in disaggregation.

Referring to FIG. 3A, reference numerals 11 and 12 designate time series data of power consumption of an appliance and time series data of temperature, respectively. Assuming that a time period from to and $t_{N-1}$ in a time axis covers 24 hours, the time series data of temperature 12 (dashed outline) indicates an example of a daily pattern of temperature, in which temperature is low in morning, then rises and stays high in daytime, and then falls and stays low in evening and at night. Each element of time series data of temperature 12 may include an average value of temperature obtained by averaging temperature sampled during a predetermined time interval, for example, an average value of temperature for each several or several ten minutes. In FIG. 3A, the temperature may be an outside temperature, though not limited thereto.

The time series data of power consumption of an appliance 11 (solid outline) may be obtained by disaggregation of an aggregate signal (aggregate power consumption) sampled in 24 hours. The time axis of the time series data of power consumption 11 is common with that of the time series data of temperature 12, that is, from to and $t_{N-1}$. The time series data of power consumption 11 also indicates an example of a daily pattern of power consumption of the appliance. In FIG. 3A, the time series data of power consumption 11 may be power consumption of an air-conditioner, though not limited thereto.

When a sampling frequency of the aggregate signal (power consumption) of a plurality of appliances is different from a sampling frequency of temperature, the element number of the time series data 12 of temperature in 24 hours and the element number of the time series data 11 of power consumption of an appliance in 24 hours are different to each other.

The model creation unit 103 may create a mapping table between elements of the time series data 11 of power consumption of an appliance and elements of the time series data 12 of temperature. This mapping table enables to make correspondence between an element of the time series data of power consumption and an element of the time series data of temperature, enabling to identify an element of the time series data of temperature, to which the i-th element of the time series data of power consumption correspond.

The model creation unit 103 may categorize elements of the time series data of temperature 12 into a plurality of sections according to a value of temperature, as illustrated in FIG. 3B. In FIG. 3B, only for the sake of simplicity, along a vertical axis (temperature axis), temperature is categorized into four sections that do not overlap with each other. The temperature (temperature axis) may, as a matter of course, be categorized in sections more than four. A width of the section may be a unit degree of temperature or several or more times of a unit degree of temperature according to an application (use case). Widths of respective sections may be different to each other.

In FIG. 3B,

Section 0: more than $T_0$ and less than or equal to $T_1$;
section 1: more than $T_1$ and less than or equal to $T_2$ ($T_1$-$T_2$);
section 2: more than $T_2$ and less than or equal to $T_3$ ($T_2$-$T_3$); and
section 3: more than $T_3$, where $T_1 < T_2 < T_3$.

Regarding mapping between the time series data of power consumption of an appliance 11 (waveform) and the above four sections of temperature, a time interval $(t_0$-$t_a)$ and a time interval $(t_f$-$t_{N-1})$ of the time series data of power consumption of an appliance 11 correspond to the section 0: less than or equal to $T_1$.

A time interval $(t_a$-$t_b)$ and a time interval $(t_e$-$t_f)$ of the time series data of power consumption of an appliance 11 correspond to the section 1: $T_1$-$T_2$.

A time interval $(t_b$-$t_c)$ and a time interval $(t_d$-$t_e)$ of the time series data of power consumption of an appliance 11 correspond to the section 2: $T_2$-$T_3$.

A time interval $(t_c$-$t_d)$ of the time series data of power consumption of an appliance 11 corresponds to the section 3: more than $T_3$ of temperature.

The sections 0, 1, 2 and 3 may be represented by respective representative values, such as $T_0$, $T_1$, $T_2$, and $T_3$. In this case, temperature at any point of time between $t_0$ and $t_a$ and between $t_f$ and $t_{N-1}$ may be estimated to (or identified with) the representative temperature: $T_0$;

temperature at a point of time between $t_a$ and $t_b$ and between $t_e$ and $t_f$ may be estimated to (or identified with) the representative temperature: $T_1$;

temperature at any point of time between $t_b$ and $t_c$ and between to and $t_e$ may be estimated to (or identified with) the representative temperature: $T_2$; and temperature at any point of time between $t_0$ and $t_c$ may be estimated to (or identified with) the representative temperature: $T_3$.

The model creation unit 103 obtains one or more pairs of power consumption $P_i$ and corresponding state $S_i$ of the appliance: $(P_i, S_i)$ (i=1, ... , o, where o is the number of elements) between a time interval ($t_0$-$t_a$) and a time interval ($t_f$-$t_{N-1}$) of the time series data of power consumption of an appliance 11 and stores (resistors) $(P_i, S_i)$ in association with a temperature $T_0$ and an appliance name (appliance ID (Identity)).

The model creation unit 103 obtains one or more pairs of power consumption $P_j$ and corresponding state $S_j$ of the appliance: $(P_j, S_j)$ (j=1, ... , p, where p is the number of elements) between a time interval ($t_a$-$t_b$) and a time interval ($t_e$-$t_f$) of the time series data of power consumption of an appliance 11 and stores (resistors) $(P_j, S_j)$ in association with a temperature $T_1$ and the appliance name (appliance ID (Identity)).

The model creation unit 103 obtains one or more pairs of power consumption $P_k$ and corresponding state $S_k$ of the appliance: $(P_k, S_k)$ (k=1, ... , q, where q is the number of elements) between a time interval ($t_b$-$t_c$) and a time interval ($t_d$-$t_e$) of the time series data of power consumption of an appliance 11 and stores $(P_k, S_k)$ in association with a temperature $T_2$ and the appliance name (ID).

The model creation unit 103 obtains one or more pairs of power consumption $P_l$ and corresponding state $S_l$ of the appliance: $(P_l, S_l)$ (l=1, ... , r, where r is the number of elements) between a time interval ($t_c$-$t_d$) of the time series data of power consumption of an appliance 11 and stores $(P_l, S_l)$ in association with a temperature $T_3$ and the appliance name (ID).

The model creation unit 103 groups and stores the obtained one or more pairs $(P_i, S_i)$ (i=1, ... , o) in association with temperature $T_0$ and an appliance name (ID): A1 in the table 110 in the storage unit 104. The model creation unit 103 may obtain a representative one pair of power consumption and state from among $(P_i, S_i)$ (i=1, ... , o) and store the representative one pair in association with temperature $T_0$ and the appliance name (ID): A1 in the table 110. The reason is that there is such a case that states $S_i$ (i=1, ... , o) are the same. For example, in the example illustrated in FIG. 3B, a state(s) of the appliance indicated by the time series of power consumption of an appliance 11 between a time interval ($t_0$-$t_a$) and a time interval ($t_f$-$t_{N-1}$) of the time series data of power consumption of an appliance 11 may belong to the same low-power state such as a standby (idling) state or sleep state. The model creation unit 103 may obtain a representative power consumption value of the appliance by averaging $P_i$ (i=1, ... , o).

The model creation unit 103 groups and stores the obtained one or more pairs $(P_j, S_j)$ (j=1, ... , p) in association with temperature $T_1$ and the appliance name (ID) A1 in the table 110. The model creation unit 103 may obtain a representative one pair of power consumption and state from among $(P_j, S_j)$ (j=1, ... , p) and store one pair in association with temperature $T_1$ and the appliance name (ID): A1 in the table 110. The reason is that there is such a case that states $S_j$ (j=1, ... , p) are the same. The model creation unit 103 may obtain a representative power consumption value by averaging $P_j$ (j=1, ... , p).

The model creation unit 103 groups and stores the obtained one or more pairs $(P_k, S_k)$ (k=1, ... , q) in association with temperature $T_2$ and the appliance name (ID): A1, in the table 110. The model creation unit 103 may obtain a representative one pair of power consumption and state from among $(P_k, S_k)$ (k=1, ... , q) and store one pair in association with temperature $T_3$ and the appliance name (ID): A1 in the table 110. The reason is that there is such a case that states $S_k$ (k=1, ... , q) are the same. The model creation unit 103 may obtain a representative power consumption value by averaging $P_j$ (k=1, ... , q).

The model creation unit 103 groups and stores the obtained one or more pairs $(P_l, S_l)$ (l=1, ... , r) in association with temperature $T_3$ and the appliance name (ID): A1, in the table 110. The model creation unit 103 may obtain a representative one pair of power consumption and state from among $(P_l, S_l)$ (l=1, ... , 4) and may store one pair in association with temperature $T_3$ and the appliance name (ID): A1 in the table 110 in the storage unit 104. The reason is that there is such a case that states $S_l$ (l=1, ... , q) are the same. The model creation unit 103 may obtain a representative power consumption value by averaging $P_l$ (l=1, ... , r).

The model creation unit 103 may create the table 110 with an individual power consumption and state of each appliance obtained by disaggregation of an aggregate power consumption. Alternatively, the model creation unit 103 may create the table 110 with an individual power consumption of each appliance monitored separately for each appliance without disaggregation.

The estimation unit 106 receives times series of an aggregate signal that is a sum of power consumption of a plurality of appliances and estimates individual power consumption and a state corresponding to the power consumption of each appliance, by disaggregating the aggregate signal into each signal of individual appliance with reference to the model stored in the storage unit 104.

The residual monitoring unit 107 calculates a residual by subtracting a sum of the estimated power consumption of the plurality of appliances from the aggregate signal, at each sampling point. Thus, time series data of the residual R is obtained by subtraction of a total sum of disaggregated power consumption of individual appliances from an aggregate signal.

$$R(i)=W(i)-(w_1(i)+w_2(i)+\ldots+w_m(i))(i=1,\ldots,N),$$

where W is time series data of an aggregate signal,
$w_1$ to $w_m$ are estimated time series data of power consumption of appliances A1 to Am, respectively, and
N is a number of sampling points.

Residual may be derived by a least squares-based regression analysis in disaggregation processing.

The residual monitoring unit 107 monitors time series data of the residual to detect a change or occurrence of anomaly. When there is no anomaly present in power consumption of each appliance, the residual takes a value close to zero. When there is anomaly present in power consumption of at least an appliance, a part of anomaly component in power consumption may fall in the residual after disaggregation processing.

As illustrated in FIG. 4, when an anomaly 13 exists at some point of time: $t_k$ in time series data of power consumption of appliance 11, it is likely that a residual absolute value at a point of time: $t_k$ will be greater than zero, as illustrated in FIG. 5. Here, the residual is calculated by disaggregation processing that is assumed to provide accurate estimation based on a normal operation model of each appliance.

When the residual monitoring unit 107 detects that the residual absolute value is more than a predetermined threshold $R_{th}$ (>0) at a point of time: $t_k$, the residual monitoring unit 107 notifies the anomaly identification unit 108 of the point of time: $t_k$ at which the residual is more than the threshold $R_{th}$. Anomaly may stride over a plurality of points of time, such as $t_k$, $t_{k+1}$, and $t_{k+2}$. In the below, anomaly is represented as an instantaneous pulse or glitch, only for the simplicity of explanation.

On a reception of notice of the point of time: $t_k$ at which the residual absolute value is more than the threshold $R_{th}$ from the residual monitoring unit 107, the anomaly identification unit 108 obtains a temperature value: $T_k$, at the point of time: $t_k$, with reference to the time series data of temperature 12 stored in the storage unit 105. As described with reference to FIG. 3B, temperature at any point of time between $t_c$ and $t_d$ may be estimated to (identified with) temperature: $T_3$. That is, when the point of time: $t_k$ at which the residual absolute value is more than the threshold $R_{th}$ is between $t_c$ and $t_d$ in FIG. 3A, the anomaly identification unit 108 obtains a temperature value $T_3$, as the temperature $T_k$ in FIG. 5.

The anomaly identification unit 108 then searches the table 110 in order to find whether a pair of the power consumption and state of the appliance at the point of time: $t_k$, estimated by the estimation unit 106, matches a pair of power consumption and state registered in the table 110 in association with of an appliance ID and the temperature: $T_k$, or not.

If a pair of the estimated power consumption and state of the appliance at the point of time: $t_k$ does not match any one of one or more pairs of power consumption and state of the appliance grouped and stored in the table 110 in association with the appliance ID and the temperature: $T_k$, the anomaly identification unit 108 may determine that the anomaly is present in the appliance.

If a pair of the estimated power consumption and state of the appliance at the point of time: $t_k$ matches at least one pair of power consumption and state of the appliance grouped and stored in the table 110 in association with the appliance ID and the temperature $T_k$, the anomaly identification unit 108 may determine that the anomaly is not present in the time series data of power consumption of the appliance. The anomaly identification unit 108 may perform search for another appliance in the table 110. That is, the anomaly identification unit 108 searches the table 110 to find whether a pair of the power consumption and state of the other appliance at the point of time: $t_k$, estimated by the estimation unit 106, matches a pair of power consumption and state registered in the table 110 in association with an ID of the other appliance and the temperature $T_k$, or not.

FIG. 6 illustrates schematically contents of the table 110. For each entry of temperature $T_0$-$T_3$, there are three entries of appliances: A1 to A3, where A1-A3 are IDs of three appliances. In association with each entry of temperature $T_0$-$T_3$, and each entry of appliances A1-A3, there is provided one or more pairs of state and power consumption of each appliance in the table 110. In FIG. 6, only a pair of state and power consumption of each appliance is illustrated, states are represented by alphanumeric, and power consumption are represented not by numeric values but by alphanumeric, only for the simplicity sake.

FIG. 7 is a flowchart of the example embodiment. Referring to FIG. 7, the residual monitoring unit 107 of FIG. 1 checks whether or not an absolute value of the residual estimated by the estimation unit 106 is more than the predetermined threshold (S101).

If an absolute value of the residual is more than the predetermined threshold at some timestamp (point of time: $t_k$), then the residual monitoring unit 107 obtains temperature corresponding to the timestamp, corresponding to the residual more than the predetermined threshold (S102).

The anomaly identification unit 108 searches the table 110 to find whether the power consumption of the appliance at the point of time: $t_k$, estimated by the estimation unit 106, matches power consumption registered in the table 110 in association with the appliance (ID) and the temperature $T_k$, or not (S103).

If the estimated power consumption of the appliance at the point of time $t_k$, does not match any one of power consumption registered in the table 110 in association with the appliance (ID) and the temperature $T_k$, the anomaly identification unit 108 determines that the anomaly is present in the time series data of the power consumption of the appliance (S105).

If the estimated power consumption of the appliance at the point of time: $t_k$, matches at least one of power consumption registered in the table 110 in association with the appliance (ID) and the temperature: $T_k$, the anomaly identification unit 108 searches the table 110 to find whether the estimated state of the appliance at the point of time: $t_k$, matches a state registered in the table 110 in association with the appliance (ID) and the temperature $T_k$, or not (S104).

If the estimated state of the appliance at the point of time $t_k$, does not match any state registered in the table 110 in association with the appliance (ID) and the temperature $T_k$, the anomaly identification unit 108 determines that the anomaly is present in the time series data of the power consumption of the appliance (S105). The order of the step 104 and S105 may be interchanged.

If the estimated state of the appliance at the point of time $t_k$, matches a state registered in the table 110 in association with the appliance (ID) and the temperature $T_k$, the anomaly identification unit 108 determines that the anomaly is not present in the time series data of the power consumption of the appliance. The anomaly identification unit 108 searches another appliance in the table 110.

In the case of the table 110 illustrated in FIG. 6, when the anomaly is not present in the power consumption of the appliance ID: A1 for temperature: $T_1$, then the anomaly identification unit 108 checks state and power consumption of the appliance ID: A2 grouped in association with temperature $T_1$. When the anomaly is not present in the power consumption of the appliance A2 for temperature $T_1$, then the anomaly identification unit 108 checks state and power consumption of the appliance A3 grouped in association with temperature $T_1$.

FIG. 8A illustrates a use case where the anomaly detection apparatus 100 acquires power consumption or current consumption time series data received from a sensor 21 installed in a main breaker or a branch breaker of a distribution board 24, or from a smart meter 25 via B route. The anomaly detection apparatus 100 acquires temperature time series data from a thermometer 22. Though not limited thereto, in the case of FIG. 8A, the anomaly detection apparatus 100 acquires power consumption or current consumption time series data and temperature time series data, via, for example, a SEMS (Store Energy Management System) Controller 23. Alternatively, in place of SEMS Controller, BEMS (Building Energy Management System), HEMS (Home Energy Management System), or FEMS (Factory Energy Management System) controller may be used.

FIG. 8B illustrates estimated current consumption waveforms $11_1$-$11_3$ that are disaggregated by the anomaly detection apparatus 100 from an aggregate current consumption 10 which is the total sum of current consumption of Appliances A1-A3 connected to a power feeder line from the distribution board 24 in FIG. 8A. In the case of FIG. 8B, there is no anomaly, and an estimated residual 14 is kept close to zero.

The disaggregation detection apparatus 100 (or system) described in the above example embodiments may be implemented on a computer system such as a server system (or a cloud system), as illustrated in FIG. 9, for example. Referring to FIG. 9, a computer system 200, such as a server system, includes a processor (Central Processing Unit) 201, a memory 202 that may include, for example, a semiconductor memory (for example, Random Access Memory (RAM), Read Only Memory (ROM), Electrically Erasable and Programmable ROM (EEPROM), and/or a storage device including at least one of Hard Disk Drive (HDD), Compact Disc (CD), Digital Versatile Disc (DVD) and so forth, I/O interfaces 203 and 204, a communication interface 205, a display/input apparatus 206 which is connected to the processor 201 via the I/O interfaces 203, and a storage apparatus 207 which is connected to the processor 201 via the I/O interfaces 204.

The computer system 200 can connect to a network 208 such as LAN (Local Area Network) and/or WAN (Wide Area Network) via the communication interface 205 that may include one or more network interface controllers (NICs). A program for executing the process of the anomaly detection apparatus 100 in FIG. 1 is stored in a memory 207 and the processor 201 reads the program into a main memory provided in the memory 202, from the storage 207 to execute the program to realize the anomaly detection function according to the example embodiment.

In the above example embodiment, an electric power (power consumption) is used as the first signal, and temperature is used as a second signal, but the first and second signals are, as a matter of course, not limited thereto. For example, the first signal may be a current and the second signal may be temperature. Furthermore, the second signal may be any one of temperature, humidity, mechanical oscillation, and sound, or combination of at least two of the above. Alternatively, the second signal may be any one of the number of visitors, and/or sales volume, in an application of store monitoring system.

The disclosure of the aforementioned PTLs 1-3 is incorporated by reference herein. The particular example embodiments or examples may be modified or adjusted within the scope of the entire disclosure of the present invention, inclusive of claims, based on the fundamental technical concept of the invention. In addition, a variety of combinations or selections of elements disclosed herein may be used within the concept of the claims. That is, the present invention may encompass a wide variety of modifications or corrections that may occur to those skilled in the art in accordance with the entire disclosure of the present invention, inclusive of claims and the technical concept of the present invention.

The invention claimed is:

1. An anomaly detection apparatus comprising:
   a processor; and
   a memory storing program instructions executable by the processor,
   wherein the processor, when executing the program instructions stored in the memory, acquires time series data of an aggregate signal that is a sum of first signals of a plurality of appliances, and time series data of a second signal;
   creates a table including one or more pairs of a value of the first signal and a corresponding state of each appliance, in association with a value of the second signal;
   receives time series data of the aggregate signal to estimate time series data of the first signal of each appliance by disaggregating the aggregate signal into each first signal of an individual appliance;
   calculates a residual by subtracting a sum of the estimated first signals of the plurality of appliances from the aggregate signal; and
   obtains a value of the second signal at a time point at which the residual indicates presence of anomaly, and checks if there is a match of a pair of a value of the estimated first signal and an estimated state of the appliance, with any one of the one or more pairs of a value of the first signal and a state of the appliance, stored in the table, in association with the value of the second signal at the time point at which the residual indicates presence of anomaly to identify the appliance with anomaly.

2. The anomaly detection apparatus according to claim 1, wherein the processor, when executing the program instructions stored in the memory, determines that anomaly is present in the time series data of the first signal of the appliance when a result of the checking indicates that there is no match, while the processor determines that anomaly is not present in the time series data of the first signal of the appliance when the result of the checking indicates that the match is found.

3. The anomaly detection apparatus according to claim 1, wherein the table includes, an entry, for each preset value of the second signal, including an appliance ID, and at least a pair of a value of the first signal corresponding to the preset value of the second signal, and a state of the appliance corresponding the value of the first signal.

4. The anomaly detection apparatus according to claim 1, wherein the first signal includes power consumption or current consumption of the appliance.

5. The anomaly detection apparatus according to claim 1, wherein the second signal includes temperature.

6. A computer-based method of detecting anomaly, comprising:
   acquiring time series data of an aggregate signal that is a sum of first signals of a plurality of appliances and time series data of a second signal;
   creating a table including one or more pairs of a value of the first signal and a corresponding state of each appliance, in association with a value of the second signal;
   receiving time series data of the aggregate signal to estimate time series data of the first signal of each appliance by disaggregating the aggregate signal into each first signal of an individual appliance;
   calculating a residual by subtracting a sum of the estimated first signals of the plurality of appliances from the aggregate signal;
   obtaining a value of the second signal at a time point at which the residual indicates presence of anomaly, and checking if there is a match of a pair of a value of the estimated first signal and an estimated state of the appliance, with any one of the one or more pairs of a value of the first signal and a state of the appliance, stored in the table, in association with the value of the second signal at the time point at which the residual indicates presence of anomaly to identify the appliance with anomaly.

7. The method according to claim 6, comprising:

determining that anomaly is present in the first signal of the appliance when a result of the checking indicates that there is no match, while determining that anomaly is not present in the first signal of the appliance when the result of the checking indicates that the match is found.

8. The method according to claim 6, comprising:

creating the table including, an entry, for each preset value of the second signal, including an appliance ID, and at least a pair of a value of the first signal corresponding to the preset value of the second signal, and a state corresponding the value of the first signal.

9. The method according to claim 6, wherein the first signal includes power consumption or current consumption.

10. The method according to claim 6, wherein the second signal includes temperature.

11. A non-transitory computer readable recording medium storing therein a program causing a computer to execute anomaly detection processing comprising:

acquiring time series data of an aggregate signal that is a sum of first signals of a plurality of appliances and time series data of a second signal;

creating a table including one or more pairs of a value of the first signal and a corresponding state of each appliance, in association with a value of the second signal;

receiving time series data of the aggregate signal to estimate the time series data of the first signal of each appliance by disaggregating the aggregate signal into each first signal of an individual appliance;

calculating a residual by subtracting a sum of the estimated first signals of the plurality of appliances from the aggregate signal;

obtaining a value of the second signal at a time point at which the residual indicates presence of anomaly, and checking if there is a match of a pair of a value of the estimated first signal and an estimated state of the appliance, with any one of the one or more pairs of a value of the first signal and a state of the appliance, stored in the table, in association with the value of the second signal at the time point at which the residual indicates presence of anomaly to identify the appliance with anomaly.

12. The non-transitory computer readable recording medium according to claim 11, wherein the program stored therein causes the computer to execute the processing comprising:

determining that anomaly is present in the first signal of the appliance when a result of the checking indicates that there is no match, while determining that anomaly is not present in the first signal of the appliance when the result of the checking indicates that the match is found.

13. The non-transitory computer readable recording medium according to claim 11, wherein the program stored therein causes the computer to execute the processing comprising:

creating the table including, an entry, for each preset value of the second signal, including an appliance ID, and at least a pair of a value of the first signal corresponding to the preset value of the second signal, and a state corresponding the value of the first signal.

14. The non-transitory computer readable recording medium according to claim 11, wherein the first signal includes power consumption or current consumption.

15. The non-transitory computer readable recording medium according to claim 11, wherein the second signal includes temperature.

* * * * *